UNITED STATES PATENT OFFICE.

WILHELM NAGAJOSHI NAGAI, OF TOKYO, JAPAN, ASSIGNOR TO M. DICK BUNNELL, OF SAN FRANCISCO, CALIFORNIA.

SYNTHETICALLY-COMPOUNDED DRUG PRODUCT AND METHOD OF PRODUCING THE SAME.

1,399,144.      Specification of Letters Patent.      Patented Dec. 6, 1921.

No Drawing.      Application filed April 1, 1916. Serial No. 88,223.

*To all whom it may concern:*

Be it known that I, WILHELM NAGAJOSHI NAGAI, a subject of the Emperor of Japan, residing at Tokyo, Japan, have invented a certain new and useful Synthetically-Compounded Drug Product and Method of Producing the Same, of which the following is a specification.

My present invention relates to the synthetically produced drug product, methylenaimin, so named by me from its hemostatic action, and the method of compounding the said article, which is suitable for increasing blood-pressure and effecting local hemostasis.

This synthetic drug product is an alkaloid of the formula,

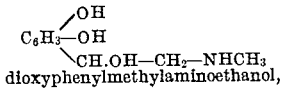
dioxyphenylmethylaminoethanol, and the physiological effects of its hydrochlorid resemble those of the active principle of the suprarenal glands.

In order that my invention may be better understood I will now describe a practically efficient method of producing the said synthetic product.

A mixture of diacetylprotocatechualdehyde, which is easily obtainable by treating the protocatechualdehyde with acetyl chlorid and sodium acetate, with nitromethane is introduced into a suitable vessel and agitated for several hours in the presence of an aqueous solution of a weak alkaline substance, such as alkalicarbonates, bicarbonates, phosphates, pyridin, etc. The resultant condensation-product of diacetylprotocatechualdehyde and nitromethane of the formula,

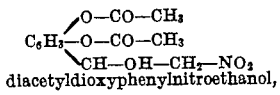
diacetyldioxyphenylnitroethanol, forms crystals not readily soluble in water or in ether. This crude product is then purified by filtering from the alkaline liquid, by pressing the crystals vigorously against the filter and finally by washing with ether. By this process the substances, that is, such portions of the nitromethane and diacetylprotocatechualdehyde as have escaped the reaction pass into the filtrate. This alkaline filtrate contains more or less protocatechualdehyde, which by the last step forms from the diacetyl-compound, but can be readily regained by the acidulation of the alkaline filtrate and by agitating or shaking with ether. The purified condensation-product is reduced in presence of formaldehyde solution by means of diluted acetic acid and zinc dust. In order to accomplish this result, the former is suspended in a mixture of a definite quantity of diluted alcohol, formaldehyde solution and diluted acetic acid, and zinc dust is gradually added, a small portion at a time, the mixture being shaken or agitated until the crystal-like powder has practically disappeared. The acid liquid is filtered from the undissolved zinc and is then saturated with hydrogen sulfid gas. After the zinc sulfid precipitate has been filtered off, the proper quantity of hydrochloric acid is added to the filtrate, and the contained alcohol, acetic acid and water are distilled off under diminished pressure. Then by drying the thick liquid remaining in a desiccator the methylenaimin hydrochlorid is obtained in form of a crystalline mass. The final product is a colorless and odorless crystalline powder which dissolves readily in water and in alcohol and which has a neutral or slightly acid reaction. When treated with ferric chlorid its aqueous solution gives a characteristic green hue which gradually changes into blue and then into purple, finally becoming red when very dilute sodium carbonate solution is added. Treatment of its aqueous solution with dilute iodin solution followed by ammonia produces a pink. The addition of silver nitrate solution to the aqueous solution of the hydrochlorid yields a white flocky precipitate.

Having thus described the nature and objects of my invention, what I claim as new and desire to secure by Letters Patent is:—

1. The method of producing a synthetic drug product which consists in condensing diacetylprotocatechualdehyde with nitromethane in the presence of a weak alkaline substance, reducing the condensation product in the presence of formaldehyde solution and then purifying the resultant reduction product and finally transmforming it into hydrochlorid, substantially as described and for the purposes set forth.

2. The method of producing dioxyphenylmethylaminoethanolhydrochlorid from the product obtained by condensing diacetylprotocatechualdehyde with nitromethane in the presence of a weak alkaline substance, which comprises reducing such condensation product in the presence of formaldehyde solution by means of diluted acetic acid and zinc-powder, and transforming the resultant reduction product into hydrochlorid, substantially as described and for the purposes set forth.

3. The method of producing dioxyphenylmethylaminoethanolhydrochlorid from the product obtained by conducting diacetylprotocatechualdehyde and nitromethane in the presence of a weak alkaline substance, which comprises reducing such condensation product in the presence of formaldehyde solution and transforming the resultant reduction product into the defined hydrochlorid by treating with hydrochloric acid, substantially as described and for the purposes set forth.

4. The method of producing a synthetic drug product which comprises condensing a protocatechualdehyde and a nitroparaffin, and reducing the condensation product in the presence of an aldehyde.

5. The method of producing a synthetic drug product which comprises condensing a protocatechualdehyde and nitro-methane, and reducing the condensation product in the presence of an aldehyde.

6. The method of producing a synthetic drug product which comprises condensing a protocatechualdehyde with a nitroparaffin, and reducing the condensation product in the presence of an aliphatic aldehyde.

7. The method of producing a synthetic drug product which comprises condensing a protocatechualdehyde with a nitroparaffin, and reducing the condensation product in the presence of formaldehyde.

8. The method of producing a synthetic drug product which comprises condensing diacetylprotocatechualdehyde with a nitroparaffin, and reducing the condensation product in the presence of an aliphatic aldehyde.

9. The method of producing a synthetic drug product which comprises condensing diacetylprotocatechualdehyde with nitromethane, and reducing the condensation product in the presence of formaldehyde.

10. In the preparation of synthetic drug products, the step which consists in condensing a protocatechualdehyde with a nitroparaffin.

11. In the preparation of synthetic drug products, the step which consists in condensing diacetylprotocatechualdehyde with a nitroparaffin.

12. In the preparation of synthetic drug products, the step which consists in condensing diacetylprotocatechualdehyde with nitromethane.

13. In the preparation of synthetic drug products, the step which consists in reducing a phenylnitrohydroxyparaffin in the presence of an aliphatic aldehyde.

14. In the preparation of synthetic drug products, the step which consists in reducing a dioxyphenylnitroethanol in the presence of an aliphatic aldehyde.

15. In the preparation of synthetic drug products, the step which consists in reducing an acidylprotocatechualdehyde-nitroparaffin condensation product in the presence of an aldehyde.

16. In the preparation of synthetic drug products, the step which consists in reducing diacetyldioxyphenylnitroethanol in the presence of formaldehyde.

17. In the preparation of synthetic drug products, the step which consists in acetylizing protocatechualdehyde.

18. As a new composition of matter, a diacidyldioxyphenylaminoethanol.

19. As a new composition of matter, a diacidyldioxyphenylalkylaminoethanol.

20. As a new composition of matter, a diacidyldioxyphenylmethylaminoethanol.

21. As a new composition of matter, diacidyldioxyphenylmethylaminoethanol.

In witness whereof, I have hereunto set my signature in the presence of the two subscribing witnesses.

WILHELM NAGAJOSHI NAGAI.

Witnesses:
CHARLES J. ARNELL,
HARRY F. HAWLEY.